US012198827B2

(12) United States Patent
Sakurai et al.

(10) Patent No.: US 12,198,827 B2
(45) Date of Patent: Jan. 14, 2025

(54) CABLE

(71) Applicant: Proterial, Ltd., Tokyo (JP)

(72) Inventors: Tamotsu Sakurai, Tokyo (JP); Masanori Kobayashi, Tokyo (JP); Setsuo Kobayashi, Ibaraki (JP); Hiromitsu Kuroda, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/675,039

(22) Filed: Feb. 18, 2022

(65) Prior Publication Data

US 2022/0344071 A1 Oct. 27, 2022

(30) Foreign Application Priority Data

Apr. 22, 2021 (JP) ................................ 2021-072244

(51) Int. Cl.

*H01B 1/02* (2006.01)
*H01B 7/22* (2006.01)
*H01B 13/016* (2006.01)
*H01B 13/26* (2006.01)

(52) U.S. Cl.

CPC ............ *H01B 1/026* (2013.01); *H01B 7/223* (2013.01); *H01B 13/0165* (2013.01); *H01B 13/26* (2013.01)

(58) Field of Classification Search

CPC . H01B 1/02; H01B 1/026; H01B 1/08; H01B 5/02; H01B 5/08; H01B 7/0036; H01B 7/02; H01B 7/223; H01B 7/04; H01B 7/17; H01B 7/18; H01B 13/065; H01B 13/26; H01B 1/00; C22C 9/00; C22C 9/02; C22C 9/04; C22C 9/06

USPC .......... 174/36, 102 R, 103, 104 R, 105, 106, 174/108, 109, 110 R, 120 R

See application file for complete search history.

(56) References Cited

U.S. PATENT DOCUMENTS

| | | | | |
|---|---|---|---|---|
| 6,518,505 | B1 | 2/2003 | Matsui et al. | |
| 6,627,009 | B1 | 9/2003 | Matsui et al. | |
| 2002/0066503 | A1* | 6/2002 | Matsui | C22C 9/00 148/432 |
| 2007/0187134 | A1* | 8/2007 | Detian | H01B 11/20 174/126.1 |
| 2012/0018192 | A1 | 1/2012 | Takahashi et al. | |
| 2016/0254074 | A1* | 9/2016 | Kobayashi | C22C 9/00 174/74 R |

(Continued)

FOREIGN PATENT DOCUMENTS

| | | | | | |
|---|---|---|---|---|---|
| CN | 104036850 | A | * | 9/2014 | H01B 7/17 |
| JP | H05311285 | A | | 11/1993 | |
| JP | 6-283051 | A | * | 10/1994 | H01B 7/04 |

(Continued)

*Primary Examiner* — William H. Mayo, III

(74) *Attorney, Agent, or Firm* — McCormick, Paulding & Huber PLLC

(57) ABSTRACT

A cable includes: a cable core including one or more electrical wires; a shield layer made of a metallic wire arranged on a periphery of the cable core; and a sheath arranged on a periphery of the shield layer. The metallic wire is made of a copper alloy wire made of a copper alloy containing indium, a content of which is equal to or more than 0.3 mass % and equal to or less than 0.65 mass %, and the metallic wire has tensile strength that is equal to or higher than 350 MPa and elongation that is equal to or higher than 7%.

6 Claims, 2 Drawing Sheets

(56) References Cited

U.S. PATENT DOCUMENTS

| | | | | | |
|---|---|---|---|---|---|
| 2016/0284437 | A1* | 9/2016 | Inoue | ........................ | C22C 9/00 |

FOREIGN PATENT DOCUMENTS

| | | | | | | |
|---|---|---|---|---|---|---|
| JP | 2002-129262 | A | * | 5/2002 | ............... | H01B 1/02 |
| JP | 2014116086 | A | * | 12/2012 | ............... | H01B 7/17 |
| JP | 2014159609 | A | | 9/2014 | | |
| JP | 2015004118 | A | | 1/2015 | | |
| WO | 2014007259 | A1 | | 1/2014 | | |

* cited by examiner

CABLE

CROSS-REFERENCE TO RELATED APPLICATION

The present application claims priority from Japanese Patent Application No. 2021-072244 filed on Apr. 22, 2021, the content of which is hereby incorporated by reference into this application.

TECHNICAL FIELD OF THE INVENTION

The present invention relates to a cable.

BACKGROUND OF THE INVENTION

A Patent Document 1 (Japanese Patent Application Laid-Open Publication No. 1993-311285) describes a copper alloy wire containing In and Sn in addition to Cu. A Patent Document 2 (Japanese Patent Application Laid-Open Publication No. 2014-159609) describes a copper alloy substance containing at least one selected from a group consisting of Ag, In Mg and Sn, a content of which is equal to or more than 0.01 atomic %, as a copper alloy substance before wire drawing. A Patent Document 3 (International Patent Publication WO/2014/007259) describes that, in steps of manufacturing a copper alloy material, an intermediate heating process is performed between a plurality of cold works. A Patent Document 4 (Japanese Patent Application Laid-Open Publication No. 2015-4118) describes that, in steps of manufacturing a copper alloy material, annealing is performed after a drawing process, and then, a finish drawing process is performed.

RELATED ART DOCUMENTS

Patent Documents

Patent Document 1: Japanese Patent Application Laid-Open Publication No. 1993-311285

Patent Document 2: Japanese Patent Application Laid-Open Publication No. 2014-159609

Patent Document 3: International Patent Publication WO/2014/007259

Patent Document 4: Japanese Patent Application Laid-Open Publication No. 2015-4118

SUMMARY OF THE INVENTION

Metallic wires each made of a copper alloy are used to various applications. For example, the metallic wires each made of a copper alloy are used as conductor wires configuring shield layers in cables functioning as internal wiring components wired in electronic devices, industrial robots, cars or others. In such a cable, a shield performance is desirably difficult to decrease even when this cable is repeatedly bent or twisted. In order to suppress the decrease in the shield performance of the shield layer, for example, it is necessary to suppress breakage of the shield layer due to the bending or the twisting of the cable.

Accordingly, a purpose of the present invention is to provide a cable in which the decrease in the shield performance of the shield layer due to the bending or the twisting is difficult to occur.

The present invention has been made in order to solve the above-described issue, and provides a cable including: a cable core including one or more electrical wires; a shield layer made of a metallic wire arranged on a periphery of the cable core; and a sheath arranged on a periphery of the shield layer, the metallic wire being made of a copper alloy wire made of a copper alloy containing indium, a content of which is equal to or more than 0.3 mass % and equal to or less than 0.65 mass %, and the cable having tensile strength that is equal to or higher than 350 MPa and elongation that is equal to or higher than 7%.

A typical embodiment of the present invention can provide a cable in which the decrease in the shield performance of the shield layer due to the bending or the twisting is difficult to occur.

BRIEF DESCRIPTIONS OF THE DRAWINGS

DESCRIPTIONS OF THE PREFERRED EMBODIMENTS

Embodiment

An embodiment of the present invention will be explained below with reference to the accompanying drawings.

Figure 1:
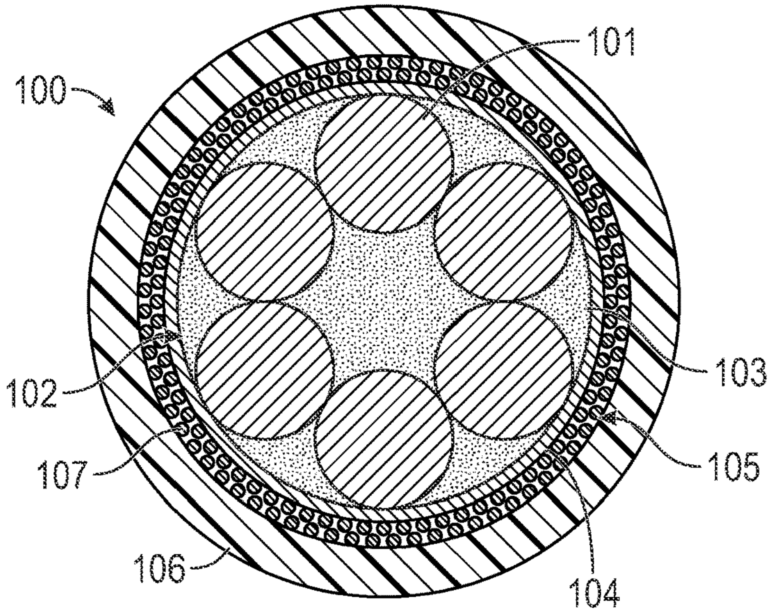
FIG. 1 is a cross-sectional schematic view showing a cross section that is vertical to a longitudinal direction of a cable according to one embodiment of the present invention.

FIG. 1 is a cross-sectional schematic view schematically showing a cross section that is vertical to a longitudinal direction of a cable according to one embodiment of the present invention. A cable 100 shown in FIG. 1 is used as, for example, internal wiring components wired in electronic devices, industrial robots, cars or others, and is an internal wiring component that is suitable to be used particularly at a repeatedly-bent or a repeatedly-twisted position.

The cable 100 includes: a cable core 103 including one or more insulated electrical wires 101 functioning as electrical wires; a shield layer 105 arranged to cover a periphery of the cable core 103; and a sheath 106 arranged to cover a periphery of the shield layer 105. In the cable 100 according to the present embodiment, a cushion layer (breakage suppressing layer) may be arranged between the cable core 103 and the shield layer 105, the cushion layer being used for suppressing breakage of a metallic wire configuring the shield layer 105 when the cable 100 is relatedly bent or repeatedly twisted.

The insulated electrical wire 101 configuring the cable core 103 includes: a conductor; and an insulator arranged to cover a periphery of the conductor. The conductor is made of a strand-wire conductor formed by braiding metallic core wires each made of a tinned soft (annealed) copper wire or others. The strand-wire conductor may be made of a combined strand wire formed by further braiding a plurality of child strand wires each formed by braiding the metallic core wires. Alternatively, the strand-wire conductor may be made of a compression conductor having a circularly-compressed cross section that is vertical to a longitudinal direction. The conductor made of the compression conductor is effective to transmit signals at a high frequency band that is equal to or higher than 1 GHz even when the cable 100 is arranged at the repeatedly-bent portion, the repeatedly-twisted portion, or a portion in which slid motion is repeatedly made while the portion is bent in a U shape. As the insulator, a material made of, for example, polyethylene, polypropylene or a fluorocarbon resin can be used. The insulator may be made of a foamed insulator. Alternatively, the insulator may be made of a stacked structure in which a plurality of insulation layers are stacked.

In the cable core 103, an inclusion made of a linear substance made of a fiber such as a spun staple thread (staple fiber yarn) is arranged at a center of the cable and in a periphery of the insulated electrical wire 101. The inclusion is braided with the plurality of (in this case, six) insulated electrical wires 101, and configures the cable core 103. The present invention is not limited to this. In the cable core 103, the linear inclusion made of the fiber may be arranged, for example, only at the center of the cable. And, the number of the insulated electrical wires 101 configuring the cable core 103 is not limited to that in the drawing. For example, the cable core 103 may be made of single insulated electrical wire 101. In this case, the cable 100 is a coaxial cable. Alternatively, the cable core 103 may be formed by, for example, braiding a different insulated electrical wire 101 with a strand wire formed by braiding two or more insulated electrical wires 101.

A tape 104 is helically wound around the cable core 103. The tape 104 plays a role of a holding member for keeping the braid of the cable core 103 from being loosened. As the tape 104, for example, a tape made of a paper, an unwoven fabric or others, or a resin tape made of PE (polyethylene) or others can be used. Note that the tape 104 is not always necessary. The braid of the plurality of insulated electrical wires 101 configuring the cable core 103 is more difficult to be loosened in the case of the helical winding of the tape 104 around the cable core 103 than a case without the winding of the tape 104. Therefore, disconnection in the insulated electrical wires 10 due to the repetitive slide motion is difficult to occur. In place of the tape 104, for example, a material covered with a resin or a material around which a string-like substance made of a cotton or others is wound is substitutable. Alternatively, the tape 104 may be not arranged depending on its intended use.

The shield layer 105 is a layer for use in blocking external noises, and is arranged to cover the periphery of the cable core 103. In the present embodiment, a braided shield that is formed by braiding a plurality of metallic wires 107 each made of a copper alloy wire described later is used as the shield layer 105. The braided shield has a braid density that is equal to or higher than 85%, and has a braid angle that is equal to or smaller than 40 degrees. When the shield layer 105 is made of such a braided shield, flexibility of the cable 100 can be improved. Therefore, even when the cable 100 is repeatedly bent or repeatedly twisted, the shield layer 105 is difficult to be broken. The shield layer 105 may be made of stacking of a plurality of braided shields. When the shield layer 105 is made of stacking of two-layer braided shields, the braided shields include a first braided shield closer to the cable core 103 and a second braided shield arranged on a periphery of the first braided shield. The first braided shield preferably has a higher braid density than that of the second braided shield. Note that each braid density of the first braided shield and the second braided shield is equal to or higher than 85%. The first braided shield preferably has a smaller braid angle than that of the second braided shield. The shield layer 105 is difficult to be broken even when the cable 100 is repeatedly bent or repeatedly twisted, because of having such braid density and braid angle.

In this example, the braided shield that is formed by braiding the plurality of metallic wires 107 each made of the copper alloy wire is used as the shield layer 105. However, the present invention is not limited to this. For example, a cross-weave braided shield that is formed by braiding the plurality of metallic wires each made of the copper alloy wire and a fiber core wire made of a fiber such as spun staple yarn, or a cross-weave braided shield that is formed by braiding the plurality of metallic wires each made of the copper alloy wire and a copper foil yarn or others can be also used as the shield layer 105. As the metallic wire 107 used for the braided shield, a material coated with a lubricant such as liquid paraffin can be also used. In this manner, abrasion between the shield layer 105 and the cable core 103 or between the shield layer 105 and the sheath 106 can be suppressed. Note that the braid density of the shield layer 105 is preferably equal to or higher than 85% in order to block the external noises. And, in place of the braided shield, a served shield that is formed by helically winding a plurality of metallic wires around the periphery of the cable core 103 may be used as the shield layer 105 in order to reduce an outer diameter of the cable 100. As the plurality of metallic wires making the served shield, the same metallic wires making the braided shield can be used. The served shield may have a two-layer structure. In this case, a first served shield closer to the cable core 103 and a second served shield arranged on a periphery of the first served shield are preferably different from each other in a winding direction. When the first served shield and the second served shield are wound in the different direction (reverse direction), disorder of a winding state of the metallic wires making the shield layer 105 difficult to occur at the time of the bending of the cable 100 (particularly the repetitive slide motion in the state in which the cable 100 is bent in the U shape).

The copper alloy wire is used as the metallic wire 107 making the shield layer 105. This copper alloy wire is made of a copper alloy containing indium (In), a content of which is equal to or more than 0.3 mass % and equal to or less than 0.65 mass %. This copper alloy contains unavoidable impurities as a remainder. A tensile strength of the metallic wire 107 made of the copper alloy wire is equal to or higher than 350 MPa (preferably equal to or higher than 350 MPa and equal to or lower than 400 MPa), an electrical conductivity of the metallic wire 107 is equal to or higher than 70% IACS (preferably equal to or higher than 70% IACS and equal to or lower than 90% IACS), and elongation of the metallic wire 107 is equal to or higher than 7% (preferably equal to or higher than 7% and equal to or lower than 18%). An outer diameter of the metallic wire 107 is, for example, equal to or larger than 0.05 mm and equal to or smaller than 0.30 mm.

Note that an index based on "IACS (International Annealed Copper Standard)" is used for the electrical conductivity. As the electrical conductivity based on the IACS, an electrical conductivity of an annealed standard soft copper (volume resistivity: $1.7241\times10^{-2}$ μΩm) is defined to be 100% IACS, and a ratio with respect to this electrical conductivity of the annealed standard soft copper is described to be "**% IACS". The electrical conductivity is calculated based on results of measurement of an electrical resistivity and a diameter of a test piece by a test method for an electrical copper wire in conformity with Japanese Industrial Standards (JIS C 3002: 1992).

Regarding the "elongation" of the metallic wire 107, a value that is calculated from results of measurement in a tensile test for a test piece by a test method for an electrical copper wire in conformity with Japanese Industrial Standards (JIS C 3002: 1992) is defined as the "elongation". Further, regarding the "tensile strength" of the metallic wire 107, a value that is calculated from results of measurement in a tensile test for a test piece by a metallic-material tensile test method in conformity with Japanese Industrial Standards (JIS Z 2241: 2001) is defined as the "tensile strength".

As the unavoidable impurities contained in the copper alloy, for example, aluminium (Al), silicon (Si), phosphorus (P), sulfur (S), chromium (Cr), iron (Fe), nickel (Ni), arsenic (As), selenium (Se), silver (Ag), antimony (Sb), lead (Pb), bismuth (Bi) and others are exemplified. The unavoidable impurities contained in the copper alloy are contained in a range that is, for example, equal to or more than 20 mass ppm and equal to or less than 30 mass ppm.

In the metallic wire 107 made of the copper alloy wire, both the tensile strength and the electrical conductivity are achieved at a high level. According to the results confirmed by the present inventions, the copper alloy wire made of the copper alloy containing the indium (In), a content of which is equal to or more than 0.3 mass % and equal to or less than 0.65 mass %, and containing the remainder made of the copper (Cu) and the unavoidable impurities has the electrical conductivity that is equal to or higher than 70% IACS and has the tensile strength that is equal to or higher than 350 MPa.

The metallic wire 107 making the shield layer 105 may be made of a plated wire in which a plating layer is arranged on an outer periphery of the copper alloy wire. The metallic wire 107 made of the plated wire has the tensile strength that is equal to or higher than 350 MPa, the electrical conductivity that is equal to or higher than 70% IACS, and the elongation that is equal to or higher than 7%. In other words, the metallic wire 107 made of the plated wire in the state in which the plating layer is arranged on the periphery of the copper alloy wire has the tensile strength that is equal to or higher than 350 MPa (preferably equal to or higher than 350 MPa and equal to or lower than 400 MPa), the electrical conductivity that is equal to or higher than 70% IACS (preferably equal to or higher than 70% IACS and equal to or lower than 90% IACS), and the elongation that is equal to or higher than 7% (preferably equal to or higher than 7% and equal to or lower than 18%). Note that the plated wire is a semihard wire material.

As descried above, the metallic wire 107 made of the plated wire includes the copper alloy wire made of the copper alloy containing the indium (In), a content of which is equal to or more than 0.3 mass % and equal to or less than 0.65 mass %. Particularly, the copper alloy wire making the plated wire is preferably made of the copper alloy containing the indium (In), a content of which is equal to or more than 0.3 mass % and equal to or less than 0.65 mass %, and containing the remainder made of the copper (Cu) and the unavoidable impurities. Alternatively, the copper alloy wire making the plated wire may be made of a copper alloy containing the indium (In), a content of which is equal to or more than 0.3 mass % and less than 0.65 mass %, the tin (Sn), a content of which is equal to or more than 0.02 mass % and less than 0.1 mass %, and the remainder made of the copper (Cu) and the unavoidable impurities. In this case, a total content ratio of the indium and the tin contained in the copper alloy is equal to or less than 0.65 mass %.

A plating layer making the plated wire is arranged on a periphery of the copper alloy wire to be in contact with a surface of the copper alloy wire. A thickness of the plating layer is, for example, equal to or larger than 0.1 μm and equal to or smaller than 1.5 The plating layer is made of, for example, tin (Sn), silver (Ag), nickel (Ni) or others.

The tensile strength of the metallic wire 107 made of the copper alloy wire making the shield layer 105 can be improved by making strain in the copper alloy. Methods for making the strain in the copper alloy include a method of making a high content ratio of other metallic elements than the copper in the copper alloy, a method of performing a drawing process and others. However, by the strain made by such a method in the copper alloy, a resistivity of the copper alloy functioning as the conductive member is increased, and therefore, the electrical conductivity of the copper alloy wire is decreased. In other words, a relation between the increase in the tensile strength of the copper alloy wire and the increase in the electrical conductivity of the copper alloy wire is a trade-off relation.

Accordingly, in order to find a configuration for improving properties of the electrical conductivity and the tensile strength of the solid-solution strengthened copper alloy, the present inventors and others have paid attention to influence of solid solution of a plurality of types of metallic elements in the copper alloy on the decrease in the electrical conductivity of the copper alloy and attention to a degree of contribution of the solid solution to the increase in the tensile strength. In other words, the degree of the contribution to the improvement of the tensile strength of the copper alloy wire depends on the type of the metallic element. And, the tensile strength increases in proportional to increase in the content ratio of the solid-solved element in the copper. The tin (Sn) and the indium (In) have larger influence on the increase in the tensile strength than the aluminium (Al), the nickel (Ni), the magnesium (Mg) and others when being solid-solved in the copper, and therefore, are effective additive elements.

On the other hand, regarding the influence on the decrease in the electrical conductivity, a degree of the influence significantly depends on the type of the metallic element. Specifically, the silver (Ag), the indium (In) or the magnesium (Mg) can more suppress the decrease in the electrical conductivity than the metals such as the nickel (Ni), the tin (Sn) and the aluminium (Al) even when the concentration of its solid solution in the copper is large. For example, when the concentration (mass concentration) of the metallic element that is solid-solved in an oxygen-free copper is 900 ppm, while an electrical conductivity in the case of the tin (Sn) with respect to an electrical conductivity in a pure copper to be 100% (percentage) decreases down to about 92%, an electrical conductivity in the case of the indium (In) with respect to the same decreases down to only about 98%. An electrical conductivity in the case of the silver (Ag) with respect to the electrical conductivity in the pure copper to be 100% (percentage) decreases down to only about 99%.

As seen from the above-described properties, the copper alloy resulted from the solid solution of the indium in the copper has the high-level electrical conductivity and tensile strength. Note that the copper alloy resulted from the solid solution of the silver (Ag) in the copper has a higher electrical conductivity than that of the copper alloy wire of the present embodiment. However, in the same concentration, the silver has a smaller effect for the increase in the tensile strength than the indium, and therefore, increase of the content amount of the silver increases a raw material cost of the copper ally wire, thus, the solid solution of the indium is preferable.

In order to improve the tensile strength of the copper alloy, a content ratio of oxygen in the copper alloy is preferably small. In the present embodiment, a content of the oxygen in the copper alloy is equal to or less than 0.002 mass %. When the content of the oxygen in the copper alloy is equal to or less than 0.002 mass %, the decrease in the tensile strength of the copper alloy due to the oxygen can be suppressed.

As a modification example of the metallic wire 107, a copper alloy wire is made of a copper alloy containing the indium (In), a content of which is equal to or more than 0.3 mass % and less than 0.65 mass %, and the tin (Sn), a content of which is equal to or more than 0.02 mass % and less than 0.1 mass %, and containing the copper (Cu) and the unavoidable impurities as the remainder in some cases. Note that a total content ratio of the indium and the tin in the copper alloy is equal to or less than 0.65 mass %.

The modification example of the metallic wire 107 provides a relatively lower electrical conductivity than that of the copper alloy wire not containing the tin, because the copper alloy contains the solid-solved tin. However, the electrical conductivity that is equal to or higher than 70% IACS can be maintained when the content ratio of the tin is less than 0.1 mass % while the indium, a content of which is equal to or more than 0.3 mass %, is contained. However, the total content ratio of the indium and the tin in the copper alloy is desirably equal to or less than 0.65 mass %. As described above, in the modification example of the copper alloy wire, by the solid solution of the tin at a predetermined content, the electrical conductivity that is equal to or higher than 70% IACS can be maintained, and the raw material cost of the copper alloy wire can be reduced.

The sheath 106 covers the periphery of the shield layer 105, and plays a role of protecting the shield layer 105 and the cable core 103. The sheath 106 is made of, for example, a resin composite containing at least one type of a polyvinyl chloride resin, an urethane resin, a fluorocarbon resin, a fluorocarbon rubber and others, as a main (basic) component.

<Method of Manufacturing Metallic Wire>

Figure 2:
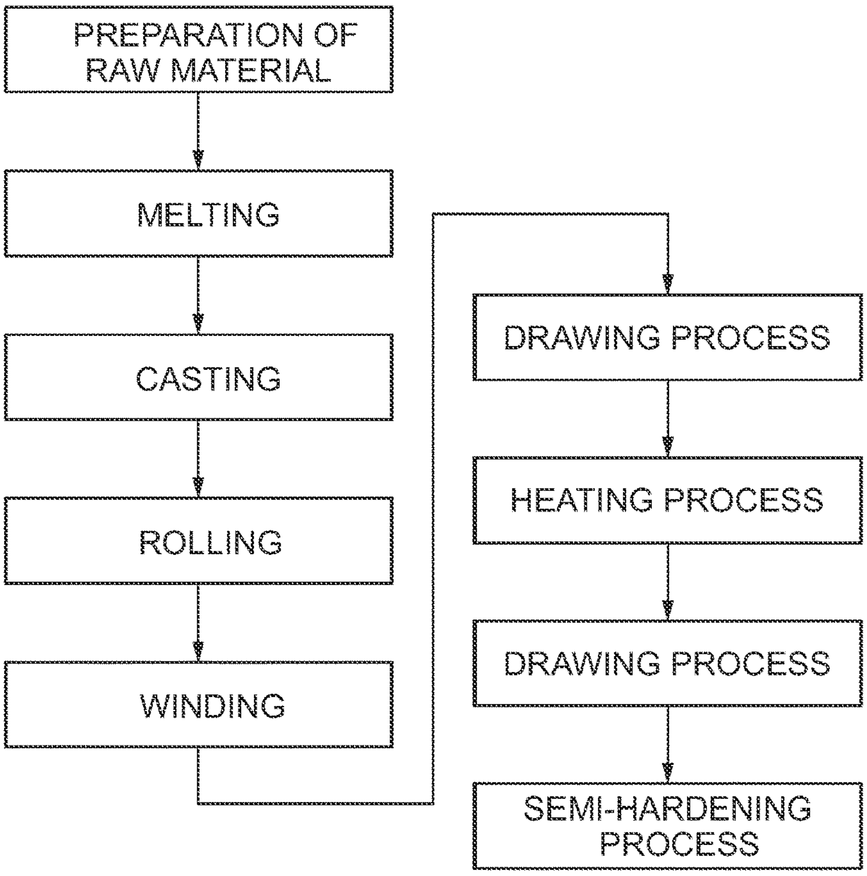
FIG. 2 is a flowchart showing one example of steps of manufacturing a metallic wire used for a shield layer of the cable according to one embodiment of the present invention.

Next, a method of manufacturing the metallic wire 107 making the shield layer 105 of the cable 100 will be explained. Although the metallic wire 107 includes the case containing the tin in the copper alloy and the case not containing it, the manufacturing methods are the same as each other. FIG. 2 is a flowchart showing one example of steps of manufacturing the metallic wire 107 for used in the shield layer 105 of the cable 100.

As the method of manufacturing the metallic wire, a method of manufacturing the metallic wire by a continuous cast rolling method of manufacturing a wire rod having a certain outer diameter (for example, about 8 mm to 12 mm), and then, performing a wire drawing process to the wire rod will be exemplified and explained below. As the continuous cast rolling method, for example, a continuous cast rolling method that is called a SCR (Southwire Continuous Rod system) method can be used.

First, in a raw-material preparing step shown in FIG. 2, a raw material is prepared. The raw material is a metal containing copper as a main component. The raw material contains the unavoidably-mixed impurity elements as described above in addition to the copper in some cases. The raw material contains the additive element including the indium. In the method of manufacturing the metallic wire explained in the modification example of the metallic wire, the additive elements are the indium and the tin. To the raw material containing the copper as the main component, these additive elements are added within a range satisfying the above-described conditions of the content ratios.

Next, in a melting step shown in FIG. 2, the raw material is melted in a melting furnace not illustrated. The melting furnace is a heating furnace capable of continuously melting the raw material, and the molten copper melted in the melting furnace is sequentially moved to a temperature holding furnace not illustrated.

Next, in a casting step shown in FIG. 2, the molten copper in the temperature holding furnace is flowed into a mold not illustrated, and then, is solidified by cooling. The solidified ingot (casting material) is detached from the mold, and is sequentially fed to a rolling mill. The melting step to the casting step shown in FIG. 2 are performed under inert gas atmosphere (such as nitrogen atmosphere). The oxygen hardly exists in the inert gas atmosphere, and an oxygen concentration (volume concentration) is at least equal to or lower than 10 ppm. By such manufacturing of the wire rod under the inert gas atmosphere having the extremely low oxygen concentration, the oxygen can be suppressed from being contained in the copper in the casting step.

Next, in a rolling step shown in FIG. 2, the ingot is rolled/milled to form the wire rod having the outer diameter of about 8 mm to 12 mm. In the rolling step, the rolling process is performed a plurality of separated times in some cases. When the ingot resulted from the casting step is used as the wire rod as it is, note that this rolling step can be omitted. To the wire rod, a surface cleansing process such as removal of oxides may be performed after the rolling step.

Next, in a winding step shown in FIG. 2, the wire rod is wound by a winding machine not illustrated to provide a wire rod roll.

Next, in a drawing process step shown in FIG. 2, the wire rod is drawn until the wire rod has a desirable outer diameter (that is, for example, equal to or larger than 0.05 mm and equal to or smaller than 0.30 mm) to provide a hard drawn material. The drawing process step is performed as so-called cold work at a room temperature (such as 25° C.). In the drawing process step of drawing the wire rod in an extending direction, the drawing process step is divided into a plurality of steps (a first drawing process step and a second drawing process step), and a heating process is performed to the drawn material during the drawing process as a heating process step between the drawing process steps.

By the occurrence of the strain in the metallic wire during the drawing process step, the tensile strength of the metallic wire can be increased, but the electrical conductivity of the metallic wire is decreased. By the heating process in the middle of the drawing process, the strain in the metallic wire is decreased. Therefore, the tensile strength of the heating-processed metallic wire is decreased, but the electrical conductivity of the same is increased. From the studies made by the inventors of the present application, it has been found that the tensile strength and the electrical conductivity of the final-resultant semi-hard metallic wire can be maintained to be high by a heating process step in the middle of the drawing process (between the first drawing process step and the second drawing process step) as satisfying the following conditions. Note that the semi-hard metallic wire described here is a metallic wire having elongation that is equal to or higher than 7% and equal to or lower than 18%.

When a relation "C=B/A" is defined under a condition in which the tensile strength of the metallic wire before the heating process (after the drawing process step immediately before the heating process) is represented by "A" while the tensile strength of the metallic wire after the heating process (immediately after the heating process) is represented by "B", the heating process is performed to satisfy a value "C" that is a ratio of the tensile strengths to be equal to or larger than 0.5 and equal to or smaller than 0.8. And, when a relation "F=E/D" is defined under a condition in which the elongation of the metallic wire before the heating process (after the drawing process step immediately before the heating process) is represented by "D" while the elongation of the metallic wire after the heating process (immediately after the heating process) is represented by "E", the heating process is performed to satisfy a value "F" that is a ratio of the elongations to be equal to or larger than 10 and equal to or smaller than 50. Since the drawing process is further performed after the heating process step as shown in FIG. 2, the heating process in the heating process step is preferably performed so that the electrical conductivity of the metallic wire immediately after the heating process step is equal to or higher than 86% IACS (more preferably equal to or higher than 88% IACS). And, the tensile strength of the metallic wire immediately after the heating process step is preferably equal to or higher than 60 MPa and equal to or lower than 200 MPa, and the elongation of the metallic wire immediately after the heating process step is preferably equal to or higher than 20% and equal to or lower than 40%. In this manner, the electrical conductivity after the drawing process step (the second drawing process step) following the heating process step can be made to be equal to or higher than 70% IACS. In the above-described heating process step, note that the heating process is preferably performed at a temperature, for example, that is equal to or higher than 400° C. and equal to or lower than 900° C.

The explanation for the embodiment in FIG. 2 is that the wire rod is drawn by the drawing process step (the first drawing process step) until the desirable outer diameter (the outer diameter that is, for example, equal to or larger than 0.50 mm and equal to or smaller than 3.00 mm) is provided, and then, the heating process step of heating the drawn material is performed under the above-described condition, and the wire rod is further drawn by the drawing process step (the second drawing process step) until the desirable outer diameter (the outer diameter that is, for example, equal to or larger than 0.05 mm and equal to or smaller than 0.30 mm) is provided. However, various modification examples are applicable. For example, the second drawing process step may be divided into a plurality of drawing process steps, and the material to be drawn may be drawn stepwise by each step of the plurality of drawing process steps until the desirable wire diameter is provided. In the second drawing process step, the stepwise drawing of the material to be drawn by the plurality of drawing process steps can more stably provide the above-described hard drawn material than the case of the second drawing process step made of the single drawing process step. When the second drawing process step is made of the plurality of drawing process steps, note that the heating process step may be arranged between the plurality of drawing process steps if needed. The hard drawn material described here is a metallic wire having elongation that is equal to or higher than 0.5% and equal to or lower than 3% and having the outer diameter that is equal to or larger than 0.05 mm and equal to or smaller than 0.30 mm.

Next, a semi-hardening process is performed to the hard drawn material having the desirable outer diameter resulted from the drawing process step. By the semi-hardening process to the hard drawn material, a semihard copper alloy wire is provided. In the semi-hardening process, the hard drawn material resulted from the drawing process step is preferably heated under, for example, a heating condition at a heating temperature that is equal to or higher than 520° C. and equal to or lower than 580° C. for heating time that is equal to or longer than 0.3 seconds and equal to or shorter than 0.8 seconds. This manner provides the copper alloy wire having the tensile strength that is equal to or higher than 350 MPa and equal to or lower than 400 MPa, the electrical conductivity that is equal to or higher than 70% IACS and equal to or lower than 90% IACS, the elongation that is equal to or higher than 7% and equal to or lower than 18%, and the outer diameter that is equal to or larger than 0.05 mm and equal to or smaller than 0.30 mm. Such a resultant copper alloy wire can be used as the metallic wire 107 of the shield layer 105.

The metallic wire 107 made of the plated wire is provided by the formation of the plating layer on the copper alloy wire resulted from the method of manufacturing the metallic wire shown in FIG. 2. The copper alloy wire before the formation of the plating layer is the semihard metallic wire having the tensile strength that is equal to or higher than 350 MPa and the electrical conductivity that is equal to or higher than 70% IACS. This copper alloy wire is dipped into a plating bath that stores a molten plating material (such as Sn) at a predetermined temperature (that is, for example, equal to or higher than 250° C. and equal to or lower than 300° C.). In this manner, molten-plating (hot-dip coating) is applied on the entire outer periphery of the copper alloy wire. Then, the hot-dip coated copper alloy wire is made pass through a plating die to adjust a thickness of the hot-dip coating on the surface of the copper alloy wire, and the plating layer having the predetermined thickness is formed. Particularly as a condition of the hot-dip coating on the surface of the copper alloy wire, the coating may be preferably performed under a condition of dipping time in the molten plating material to be equal to or longer than 0.1 second and equal to or shorter than 1.0 second at a linear velocity that is equal to or higher than 100 m/min. The copper alloy wire including the plating layer that is formed as described above is maintained in the semihard state, and the elongation of the plated wire is equal to or higher than 7% and equal to or lower than 18%.

<Working Example>

Next, evaluation results of properties of the cable 100 will be explained.

A cable is used in the present working example, the cable including the tape that is helically wound around the cable core including four insulated electrical wires, including, around this tape, the braided shield (shield layer) formed by the braiding of the plurality of metallic wires, and besides, including the sheath around this braided shield. Braiding of an insulated electrical wire and an inclusion made of spun staple yarn is used as the cable core, the insulated electrical wire including an insulation (having a thickness of about 0.13 mm) made of a fluorocarbon resin covering, by tube extrusion, an outer periphery of a conductor made of a 60/0.08-mm bunch stranded wire (having a lay pitch of about 15 mm) (60 bare wires each having an outer diameter of 0.08 mm) equivalent to 23 AWG (American wire gauge). The plated wire (having the outer diameter: about 0.08 mm) is used as the metallic wire of the braided shield, the plated wire including the tin-plating layer arranged on the periphery of the copper alloy wire made of the copper alloy containing the indium, a content of which is equal to or more than 0.3 mass % and equal to or less than 0.65 mass %, and the plated wire having the tensile strength that is equal to or higher than 350 MPa and equal to or lower than 400 MPa, the electrical conductivity that is equal to or higher than 70% IACS and equal to or lower than 90% IACS, and the elongation that is equal to or higher than 7% and equal to or lower than 18%. The braid density of the braided shield is designed to be equal to or higher than 85%, and the braid angle of the same is designed to be equal to or larger than 30 degrees and equal to or smaller than 40 degrees. As the sheath, a material that is formed by tube extrusion of coating the outer periphery of the braided shield with a resin composite containing polyethylene vinyl resin as a main component is used. An outer diameter of the cable is designed to be about 8 mm.

(Bending Test)

A bending test is performed to the cable having the above-described configuration.

Figure 3:
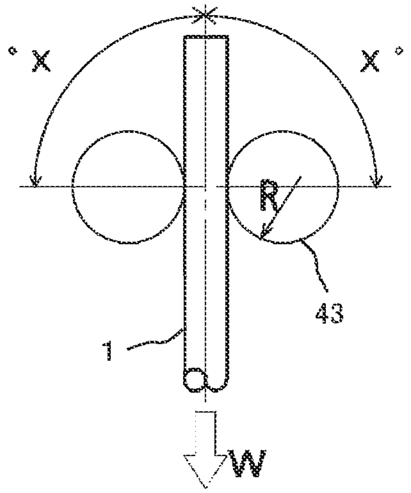
FIG. 3 is a conceptual view of a bending test.
Figure 4:
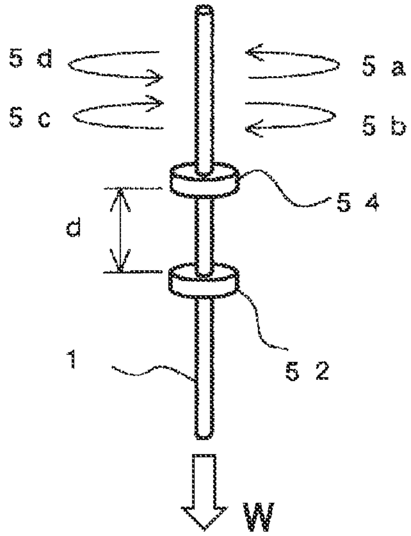
FIG. 4 is a conceptual view of a twisting test.

In the bending test, a weight having a load "W=500 gf" is hung from a lower end of the cable to be a specimen as shown in FIG. 3, and a curved bending jig 43 is attached to right and left sides of the cable while the cable is moved in right and left directions along the bending jig 43 to apply bending at a bending angle "X=±90°". A bending "R" (bending radius) is designed to be 25 mm. A bending speed is designed to be 30 times/minute, and the number of times of the bending is designed so that one reciprocation in the right and left directions is counted as one time. Then, the cable is repeatedly bent, and a resistance value of the shield layer between both ends of the cable is measured for each time. The shield layer is regarded as being broken when the measured resistance value in the bending test increases by 20% from the resistance value (initial resistance value) acquired before the bending test, and the number of times of the bending at this time is designed to be a bending lifetime.

As a result of the bending test, the shield layer of the cable according to the present working example has not been regarded as being broken since the increase rate of the resistance value is lower than 20% even when the number of times of the bending is three million three hundred thousand times. As a result, in the cable according to the present working example, it is considerable that the shield performance of the shield layer in the repetitive bending is difficult to decrease.

(Twisting Test)

A twisting test is performed to the cable having the above-described configuration.

In the twisting test, a part of the cable to be a specimen is attached to a fixing chuck 52 not rotating, and another part that is upper than the part and separate from the part by a twisting length "d=500 mm" is attached to a rotating chuck 54. Then, a weight having a load "W=1100 gf" is hung from a lower end of the cable. By rotation of the rotating chuck 54 in this state, a portion of the cable between the fixing chuck 52 and the rotating chuck 54 is twisted at ±180 degrees. As one cycle (one time in the counting), the rotating chuck 54 is moved in orders of arrows 5*a*, 5*b*, 5*c* and 5*d* to rotate at +180 degrees and return first, and then, rotate at −180 degrees and return. A twisting speed is designed to be 30 times/minute, and the number of times of the twisting is counted so that one reciprocation in each of directions is one time. Then, the cable is repeatedly twisted, and a resistance value of the shield layer between both ends of the cable is measured for each time. The shield layer is regarded as being broken when the measured resistance value in the twisting test increases by 20% from the resistance value (initial resistance value) acquired before the twisting test, and the number of times of the twisting at this time is designed to be a twisting lifetime.

As a result of the twisting test, the shield layer of the cable according to the present working example has not been regarded as being broken since the increase rate of the resistance value of the shield layer is lower than 20% even when the number of times of the twisting is one hundred eighty thousand times. As a result, in the cable according to the present working example, it is considerable that the shield performance of the shield layer in the repetitive twisting is difficult to decrease.

SUMMARY OF EMBODIMENT

Next, a technical concept as seen from the above-described embodiment will be described with reference to symbols and others in the embodiment. Regarding the following symbols and others, note that elements in the claims are not limited by the specifically-described members and others in the embodiment.

[1] A cable (100) including: a cable core (103) including one or more electrical wires; a shield layer (105) made of a metallic wire (107) arranged on a periphery of the cable core (103); and a sheath (106) arranged on a periphery of the shield layer (105), the metallic wire (107) being made of a copper alloy wire made of a copper alloy containing indium, a content of which is equal to or more than 0.3 mass % and equal to or less than 0.65 mass %, and the metallic wire having tensile strength that is equal to or higher than 350 MPa and elongation that is equal to or higher than 7%.

[2] In the cable (100) described in the statement [1], the copper alloy wire is made of a copper alloy containing tin, a content of which is equal to or more than 0.02 mass % and less than 0.1 mass %, a total content rate of the indium and the tin being equal to or less than 0.65 mass %.

[3] In the cable (100) described in the statement [1] or [2], the metallic wire (107) is made of a plated wire including a plating layer arranged on a periphery of the copper alloy wire, and has tensile strength that is equal to or higher than 350 MPa and elongation that is equal to or higher than 7%.

[4] In the cable (100) described in any one of the statements [1] to [3], the metallic wire (107) has an electrical conductivity that is equal to or higher than 70% IACS.

[5] In the cable (100) described in any one of the statements [1] to [4], the shield layer (105) is made of a braided shield having a braid density that is equal to or higher than 85% and a braid angle that is equal to or smaller than 40 degrees.

In the foregoing, the embodiment of the present invention has been described. However, the inventions according to the claims are not limited by the above-described embodiment. Note that all combinations of the features described in the embodiment are not always necessary for the means of solving the problems of the invention. The present invention is appropriately modified and executable within the scope of the concept.

What is claimed is:

1. A cable comprising:

a cable core including one or more electrical wires;

a shield layer made of a metallic wire arranged on a periphery of the cable core; and a sheath arranged on a periphery of the shield layer, wherein the metallic wire is a copper alloy wire which is made of a copper alloy containing equal to or more than 0.3 mass % and equal to or less than 0.65 mass % indium and equal to or more than 0.02 mass % and less than 0.1 mass % tin, with the remainder consisting of copper and unavoidable impurities, and the metallic wire has tensile strength that is equal to or higher than 350 MPa and elongation that is equal to or higher than 7%.

2. The cable according to claim 1, wherein the copper alloy wire is made of a copper alloy containing tin, a content of which is equal to or more than 0.02 mass % and less than 0.1 mass %, and a total content rate of the indium and the tin is equal to or less than 0.65 mass %.

3. The cable according to claim 1, wherein the metallic wire is made of a plated wire including a plating layer arranged on a periphery of the copper alloy wire, and the metallic wire has tensile strength that is equal to or higher than 350 MPa and elongation that is equal to or higher than 7%.

4. The cable according to claim 1, wherein the metallic wire has an electrical conductivity that is equal to or higher than 70% IACS.

5. The cable according to claim 1, wherein the shield layer is made of a braided shield having a braid density that is equal to or higher than 85% and a braid angle that is equal to or smaller than 40 degrees.

6. The cable according to claim 1, wherein the unavoidable impurities in the copper alloy are one or more of the following elements: aluminum, silicon, phosphorus, sulfur, chromium, iron, nickel, arsenic, selenium, silver, antimony, lead, and bismuth, and, the total content of the unavoidable impurities in the copper alloy is equal to or more than 0.002 mass % and equal to or less than 0.003 mass %.

* * * * *